US009883263B2

(12) United States Patent
Colbourne

(10) Patent No.: US 9,883,263 B2
(45) Date of Patent: Jan. 30, 2018

(54) FREE-SPACE MULTICAST SWITCH WITH ELLIPTICAL BEAMS

(71) Applicant: Lumentum Operations LLC, Milpitas, CA (US)

(72) Inventor: Paul Colbourne, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/383,368

(22) Filed: Dec. 19, 2016

(65) Prior Publication Data

US 2017/0099531 A1   Apr. 6, 2017

Related U.S. Application Data

(63) Continuation-in-part of application No. 15/345,456, filed on Nov. 7, 2016, which is a continuation of application No. 14/230,444, filed on Mar. 31, 2014, now Pat. No. 9,488,787.

(51) Int. Cl.
*G02B 6/26* (2006.01)
*H04Q 11/00* (2006.01)

(52) U.S. Cl.
CPC . *H04Q 11/0005* (2013.01); *H04Q 2011/0015* (2013.01); *H04Q 2011/0026* (2013.01); *H04Q 2011/0035* (2013.01); *H04Q 2011/0047* (2013.01)

(58) Field of Classification Search
CPC ............................................. H04Q 2011/0015
See application file for complete search history.

(56) References Cited

U.S. PATENT DOCUMENTS

| 6,487,334 B2 | 11/2002 | Ducellier et al. |
| 6,560,000 B2 | 5/2003 | Iyer et al. |
| 6,711,316 B2 | 3/2004 | Ducellier |

(Continued)

FOREIGN PATENT DOCUMENTS

| CA | 2326362 | 5/2002 |
| WO | WO 2013/066778 | 5/2013 |

OTHER PUBLICATIONS

Aksyuk et at, "238 × 2 3 8 Micromechanical Optical Cross Connect", IEEE Photonics Technology Letters, vol. 15, No. 4, Apr. 2003, 3 pages.

(Continued)

*Primary Examiner* — Sung Pak
(74) *Attorney, Agent, or Firm* — Harrity & Harrity, LLP

(57) ABSTRACT

A free-space MCS may include an input port to launch a beam of light, N output ports, a beam splitter to split the beam of light into N portions, and a deflector array including N deflectors aligned in an array direction. Each deflector may have an active region with a size in the array direction that matches a size in the array direction of a portion, of the N portions, incident thereon. The free-space MCS may include first beam shaping optics to form a first elliptical beam spot at the beam splitter with a major axis substantially perpendicular to the switching direction, and an angle-to-offset element to direct each of the N portions from the beam splitter to a different deflector of the N deflectors. Each of the N portions may have, at the deflector, a second elliptical beam spot with a major axis substantially parallel to the switching direction.

20 Claims, 6 Drawing Sheets

(56) References Cited

U.S. PATENT DOCUMENTS

| | | |
|---|---|---|
| 7,039,267 B2 | 5/2006 | Ducellier et al. |
| 8,531,752 B2 | 9/2013 | Moidu |
| 9,069,139 B2 | 6/2015 | McLaughlin et al. |
| 9,488,787 B2 | 11/2016 | Colbourne |
| 2005/0105851 A1 | 5/2005 | Stone |
| 2008/0031627 A1* | 2/2008 | Smith .................. G02B 6/2931 398/83 |
| 2009/0028503 A1 | 1/2009 | Garrett et al. |
| 2013/0272650 A1 | 10/2013 | Ishikawa et al. |
| 2014/0072302 A1 | 3/2014 | Iwama et al. |
| 2014/0254982 A1* | 9/2014 | Frisken ................ G02B 6/3518 385/17 |
| 2015/0078748 A1 | 3/2015 | Tazawa |
| 2016/0165324 A1 | 6/2016 | Zhao |
| 2016/0291255 A1* | 10/2016 | Hu ....................... G02B 6/3518 |

OTHER PUBLICATIONS

Syms, "Scaling Laws for MEMS Mirror-Rotation Optical Cross Connect Switches", Journal of Lightwave Technology, vol. 20, No. 7, Jul. 2002, 11 pages.

Co-pending U.S. Appl. No. 15/345,456, entitled "Cross-Connect Switch Using 1D Arrays of Beam Steering Elements," by Colbourne, filed Nov. 7, 2016, 35 pages.

* cited by examiner

FREE-SPACE MULTICAST SWITCH WITH ELLIPTICAL BEAMS

RELATED APPLICATION

This application is a Continuation-In-Part (OP) of U.S. patent application Ser. No. 15/345,456, filed on Nov. 7, 2016, which is a Continuation of U.S. patent application Ser. No. 14/230,444, filed on Mar. 31, 2014, the contents of which are incorporated by reference herein in their entirety.

TECHNICAL FIELD

The present disclosure relates to a multicast switch (MCS) and, more particularly, to a free-space MCS that uses elliptical beams in order to allow for a size of elements within a switch core of the free-space MCS and/or an overall size of the free-space MCS to be reduced.

BACKGROUND

In an optical communications network, an optical signal is modulated with digital information and transmitted over a length of optical fiber from a source location to a destination location. A multicast optical switch (herein referred to as a multicast switch (MCS)) allows an optical signal (e.g., including one or more wavelength channels) from a single optical fiber to be switched, simultaneously, to a plurality of optical fibers. In some cases, the MCS may allow a plurality of optical signals, from a plurality of input optical fibers, to be switched to a plurality of output optical fibers such that optical signals in any of the plurality of input optical fibers can be multicast into non-overlapping subsets of the plurality of output optical fibers.

SUMMARY

According to some possible implementations, a free-space multicast switch (MCS) may include: an input port array including an input port to launch a beam of light; an output port array including N (N>1) output ports; a beam splitter optically disposed between the input port array and the output port array, the beam splitter to split the beam of light into at least N portions in a splitting direction; a deflector array optically disposed between the beam splitter and the output port array, where the deflector array may include N deflectors aligned in an array direction, and where each deflector, of the N deflectors, may have a switching direction that is substantially perpendicular to the splitting direction, where each of the N deflectors may have an active region with a size in the array direction that matches a size in the array direction of a portion, of the N portions, incident thereon; first beam shaping optics optically disposed between the input port array and the beam splitter and second beam shaping optics optically disposed between the output port array and the deflector array, where the first beam shaping optics may shape the beam of light and form a first elliptical beam spot at the beam splitter, where a major axis of the first elliptical beam spot may be substantially perpendicular to the switching direction; and an angle-to-offset (ATO) element optically disposed between the beam splitter and the deflector array, wherein the beam splitter and the deflector array may each be disposed such that the ATO element is to direct each of the at least N portions of the beam of light from the beam splitter to a different deflector of the N deflectors, where each of the at least N portions may have, at the deflector, a second elliptical beam spot with a major axis substantially parallel to the switching direction.

According to some possible implementations, a free-space multicast switch (MCS) may include: an input port array, each input port of the input port array to launch a beam of light; an output port array including N (N>1) output ports; a beam splitter optically disposed between the input port array and the output port array to split each of the beams of light into at least N portions in a splitting direction; a deflector array optically disposed between the beam splitter and the output port array, where the deflector array may include N deflectors, where each of the N deflectors may deflect light in a switching direction perpendicular to the splitting direction, where each of the N deflectors may receive one of the N portions from each beam of light, and to couple a selected portion to an output port of the output port array, and where each of the N deflectors may have an active region with dimensions matching dimensions of the N portions incident thereon; first beam shaping optics optically disposed between the input port array and the beam splitter to transform a shape of the beams of light to be elliptical in the splitting direction at the beam splitter; angle-to-offset optics optically disposed between the beam splitter and the deflector array to transform a shape of the N portions to be elliptical in the switching direction at the deflector array; and second beam shaping optics optically disposed between the deflector array and the output port array to transform a shape of the selected portions to be circular at the output port array.

According to some possible implementations, a free-space multicast switch (MCS), may include: an input port array including an input port to launch a beam of light; first beam shaping optics to shape the beam of light and form a first elliptical beam spot at a beam splitter, where the first elliptical beam spot may have a first ellipticity ratio that is a ratio of a length of a first axis of the first elliptical beam spot to a length of a second axis of the first elliptical beam spot, where the first axis of the first elliptical beam spot may be substantially parallel to a splitting direction of the beam splitter, where the second axis of the first elliptical beam spot may be substantially perpendicular to the splitting direction of the beam splitter, and where the length of the first axis of the first elliptical beam spot may be at least four times larger than the length of the second axis of the first elliptical beam spot; the beam splitter to split the beam of light into N (N>1) portions in the splitting direction; an angle-to-offset (ATO) element to form N second elliptical beam spots, corresponding to each of the N portions, at N different deflectors of a deflector array, where each of the N second elliptical beam spots may have a second ellipticity ratio that is a ratio of a length of a first axis of the second elliptical beam spot to a length of a second axis of the second elliptical beam spot, where the first axis of the second elliptical beam spot may be substantially perpendicular to a switching direction of the deflector array, where the switching direction may be substantially perpendicular to the splitting direction, where the second axis of the second elliptical beam spot may be substantially parallel to the splitting direction of the beam splitter, and where the length of the first axis of the second elliptical beam spot being at least four times smaller than the length of the second axis of the second elliptical beam spot; the deflector array, including the N deflectors, to deflect each of the N portions in the switching direction; and an output port array including N output ports, each output port corresponding to a different deflector of the N deflectors.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

A MCS allows an optical signal to be switched, simultaneously, to a plurality of optical fibers. Within a switch core of a free-space MCS, one or more elements may be arranged to achieve such multicast switching. For example, a free-space MCS may include M input ports and N output ports. A beam splitter, arranged in the switch core of the free-space MCS, may angularly separate each of M input signal into N portions, where each portion includes each wavelength channel of a given input signal. An angle-to-offset (ATO) element may direct M portions (e.g., one from each of the M input ports) to each deflector in deflector array (e.g., a 1×N array). Each deflector of the deflector array provides a switching angle to each of the M portions striking the deflector, and corresponds to a particular output port of the N output ports. Thus, by controlling each deflector, the free-space MCS can select which input ports couple to which output ports, and allow a single input port to couple to multiple output ports.

Figure 1:
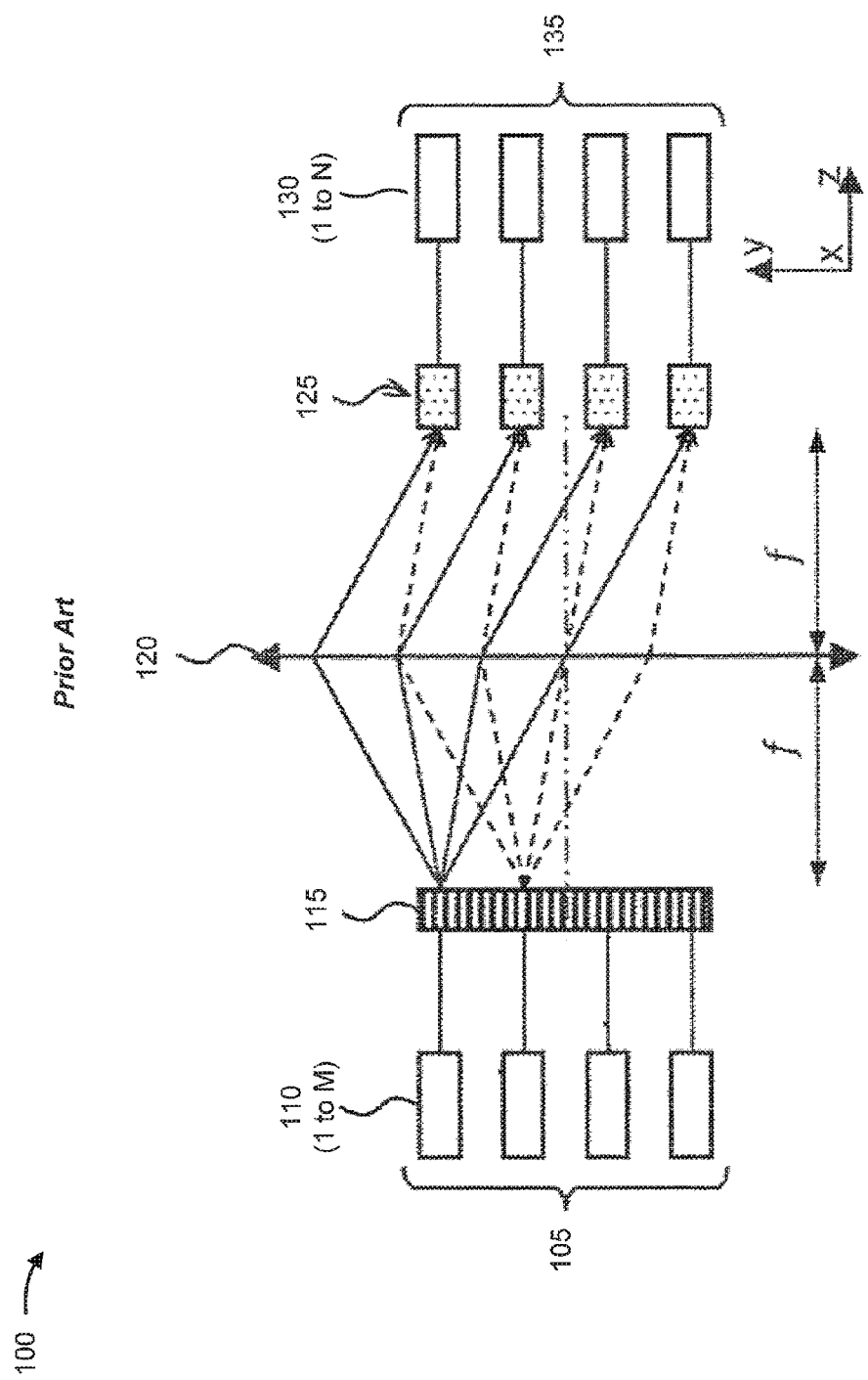
FIG. 1 is a diagram of a prior free-space multicast switch.

FIG. 1 is a diagram of a side-view of a switch core of a prior free-space MCS 100. As shown in FIG. 1, the switch core of prior free-space MCS 100 includes an input port array 105, including a quantity of M input ports 110, and a diffractive bulk optical element 115, coupled to the M input ports 110, for splitting beams of light, launched by the M input ports and impinging on diffractive bulk optical element 115, into N angularly dispersed portions (e.g., each portion including a portion of each wavelength channel of the beam). The beams launched into the switch core of prior free-space MCS 100 are round beams (i.e., beams with a circular cross section).

As further shown, the switch core of prior free-space MCS 100 includes an angle-to-offset (ATO) element 120 that directs each of the angularly dispersed N portions of a given beam to one of a set of N deflectors 125. As shown, ATO element 120 is disposed one focal length f away from diffractive bulk optical element 115, and one focal length f away from each of the N deflectors 125. Each of the N deflectors 125 is arranged to receive a portion of each of the M optical beams (e.g., such that each deflector 125 receives M portions). As further shown, each of N output ports 130, included in an output port array 135, is coupled to a corresponding one of the N deflectors 125. Here, each of the N deflectors 125 is configured for switching a portion of a selected M optical beam (i.e., one of the M portions incident on deflector 125) into a corresponding output port 130. As shown in FIG. 1, the elements of the switch core of free-space MCS 100 may be arranged in a same direction (e.g., a direction parallel to the y-axis) that is perpendicular to a direction of light propagation within the switch core of free-space MCS 100 (e.g., a direction parallel to the z-axis).

However, while prior free-space MCS 100 is capable of providing multicast switching functionality, an amount of physical space and/or an overall size of prior free-space MCS 100 may be significant (e.g., leading to higher manufacturing costs, lower efficiency in use of physical space, or the like). As such, it is desirable to reduce a size of the switch core of free-space MCS and/or an overall size of the free-space MCS as much as possible (e.g., in order to reduce cost and/or increase efficiency of physical space used).

Implementations described herein provide a free-space MCS that uses elliptical beams in order to reduce a size of a switch core of the free-space MCS and/or an overall size of the free-space MCS. For example, in some implementations, dimensions of one or more elements of the free-space MCS, such as deflectors of a deflector array, may be comparable to dimensions of an elliptical beam incident thereon, thereby allowing for a smaller deflector array design (e.g., as compared to a MCS that uses round beams). As another example, in some implementations, an element of the free-space MCS, such as an angle-to-offset (ATO) element, may have a reduced focal length due to the use of elliptical beams, thereby reducing overall size of the free-space MCS (e.g., as compared to a MCS that uses round beams). In some implementations, the elliptical beams may have a different ellipticity ratio (i.e., a ratio of axes dimensions) than the one-to-one ratio of axes dimensions associated with round beams. For example, the elliptical beams may have an ellipticity ratio that corresponds to a number of ports of the free-space MCS (e.g., 32:1, 16:1, 8:1, 4:1, or the like).

Figure 2A:
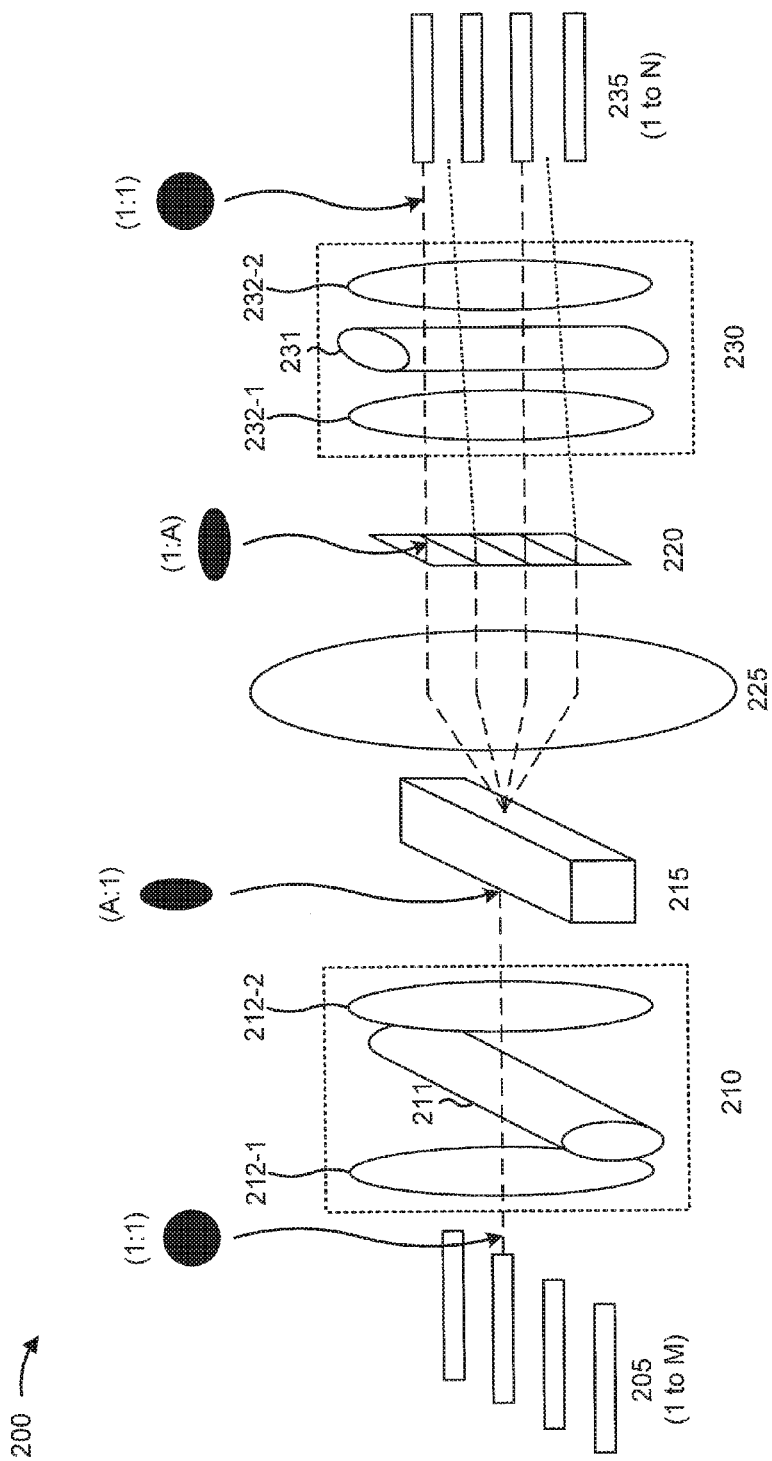
FIGS. 2A-2E are diagrams of an example switch core of a free-space MCS that uses elliptical beams in a switch core.
Figure 2B:
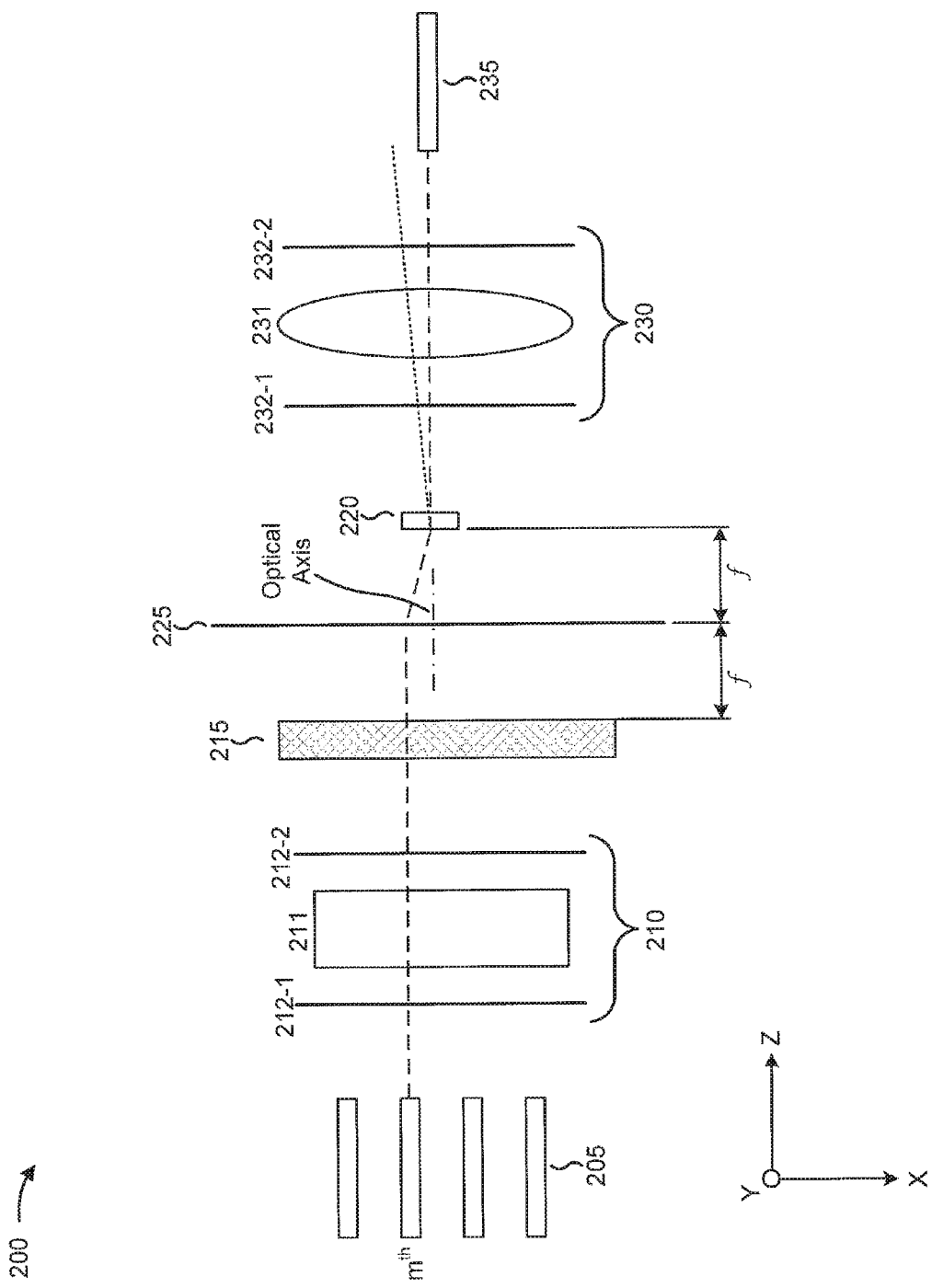
Figure 2C:
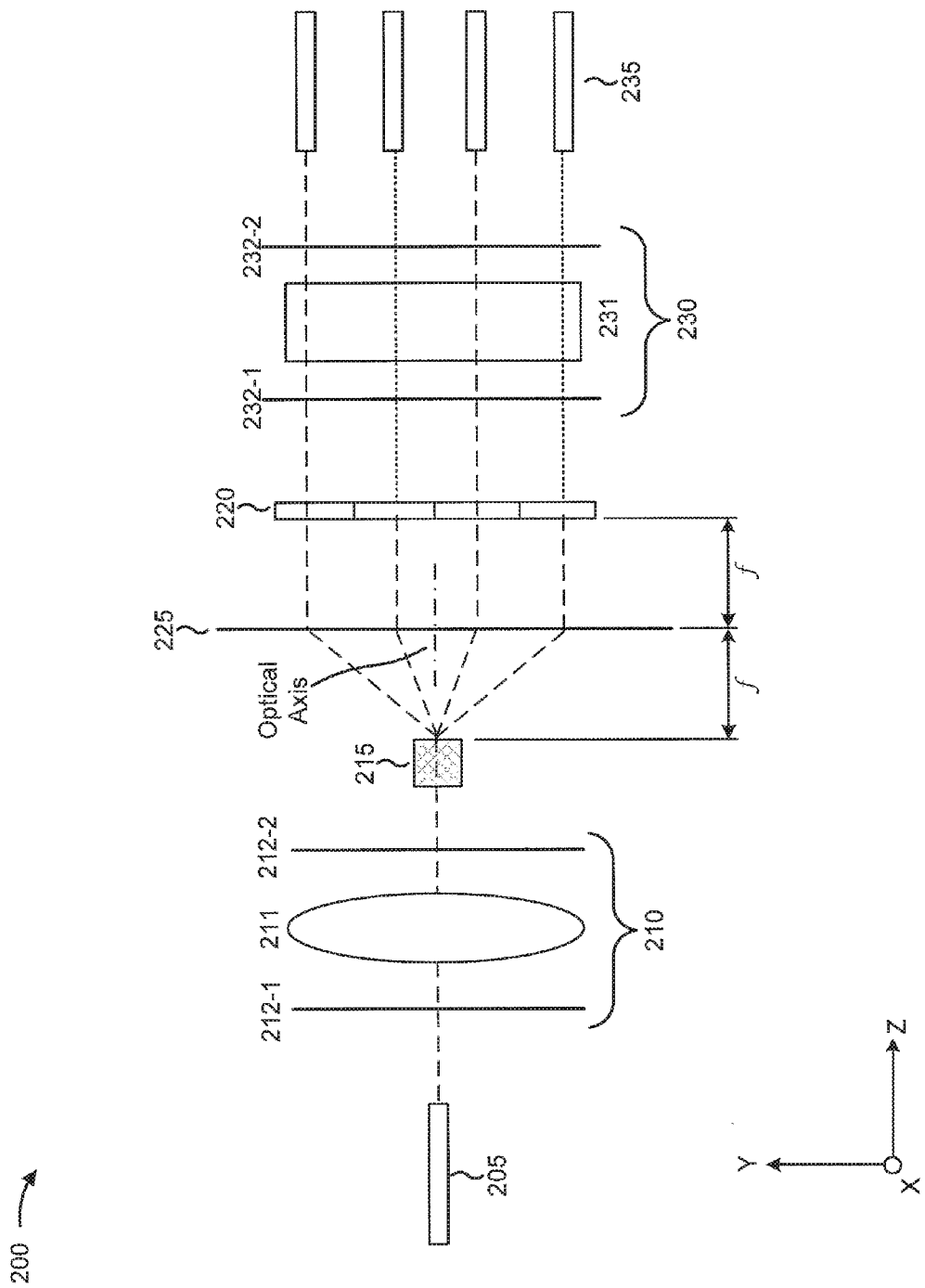

FIGS. 2A-2C are diagrams of an example switch core of free-space MCS 200 that uses elliptical beams in a switch core, as described herein. FIG. 2A is a diagram of an isometric view of the switch core of free-space MCS 200, while FIG. 2B is a diagram of a first (e.g., top) view of the example switch core of free-space MCS 200 (e.g., corresponding to an x-z plane), and FIG. 2C is a diagram of a second (e.g., side) view of the switch core of free-space MCS 200 (e.g., corresponding to a y-z plane).

As shown in FIGS. 2A-2C, the switch core of free-space MCS 200, which is illustrated in an unfolded configuration for purposes of explanation, may include an input port array 205 including M input ports, input beam shaping optics 210, a beam splitter 215, a deflector array 220, an angle-to-offset (ATO) element 225, output beam shaping optics 230, and an output port array 235 including N output ports.

The input port array 205 includes a plurality of input ports for launching a beam of light (e.g., an optical signal including one or more wavelength channels) into the switch core of free-space MCS 200, whereas the output port array 235 includes a plurality of output ports for receiving beams of light launched by the input ports of input port array 205. In some implementations, ports in input port array 205 and ports of output port array 235 are optically coupled to optical fibers or waveguides. For example, input port array 205 may be optically coupled to an input fiber array and output port array 235 may be optically coupled to an output fiber array.

Optionally, each input optical fiber/waveguide and each output optical fiber/waveguide may be optically coupled to a collimating/focusing lens centered on the optical axis thereof. For example, input port array 205 and output port array 235 may be optically coupled to an input fiber array and an output fiber array, respectively, that terminate in respective microlens arrays. In some implementations, an end of each input optical fiber/waveguide and an end of each output optical fiber/waveguide may be provided with an expanded core. In some implementations, the input fiber array may be coupled to a planar waveguide concentrator in which a waveguide spacing matches a fiber spacing on a first end coupled to the input fiber array, and the waveguide spacing is smaller than the fiber spacing on a second end. Providing each optical fiber/waveguide with a collimating/ focusing lens, an expanded core, or a waveguide concentrator allows a number of input and/or output ports of free-space MCS to be increased.

As shown in FIG. 2A, input port array 205 may include M (M>1) ports aligned in a first direction (e.g., an x-direction parallel to the x-axis) and output port array 235 may include N (N>1) ports aligned in a second direction (e.g., a y-direction parallel to the y-axis). Here, the first direction is perpendicular to the second direction, both of which are perpendicular to a direction of light propagation (e.g., a direction parallel to the z-axis). The number of input ports and/or output ports of free-space MCS 200 is between 4 and 100.

In some implementations, the number of input ports may match the number of output ports (e.g., M=N=16, such that free-space MCS 200 is a 16×16 MCS). Alternatively, the number of input ports may differ from the number of output ports (e.g., M=16, N=32, such that free-space MCS 200 is a 16×32 MCS; M=32, N=16, such that free-space MCS 200 is an 32×16 MCS).

The implementations described herein may allow for a size of deflector array 220 and/or an overall size of free-space MCS 200 to be reduced when the quantity of ports (e.g., the N output ports or the M input ports) is at least 16. Notably, while implementations described herein are described with reference to input and output ports, fibers, and waveguides, in some implementations, the ports, fibers, and, waveguides may send and/or receive optical signals (i.e., may function as either inputs or outputs), depending upon a direction of propagation of an optical signal.

Input beam shaping optics 210 and output beam shaping optics 230 each includes one or more elements for producing elliptical beam spots on beam splitter 215 and deflector 220, respectively. In particular, input beam shaping optics 210 cause beams of light propagating from ports of input port array 205 to produce elliptical beam spots on beam splitter 215 (e.g., or conversely, cause elliptical beams from beam splitter 215 to produce round spots on ports of input port array 205). Similarly, output beam shaping optics 230 cause elliptical beams from deflector array 220 to produce round spots on ports of output port array 235 (e.g., or conversely, cause beams of light propagating from ports of output port array 235 to produce elliptical beam spots on deflector array 220).

In some implementations, input beam shaping optics 210 and/or output beam shaping optics 230 may each include an anamorphic collimating/focusing element, such as a cylindrical lens, which produces unequal magnifications along two perpendicular axes. For example, in one implementation, the beam shaping optics (e.g., input beam shaping optics 210 and/or output beam shaping optics 230) may include a cylindrical lens optically disposed between two spherical lenses (e.g., cylindrical lens 211 optically disposed between spherical lens 212-1 and 212-2, cylindrical lens 231 optically disposed between spherical lens 232-1 and 232-2). In another implementation, the beam shaping optics may include a negative cylindrical lens (i.e., diverging) and a positive cylindrical lens (i.e., converging) having different optical powers. In yet another implementation, the beam shaping optics may include a pair of anamorphic prisms. In some implementations, another arrangement of spherical or aspherical lenses or mirrors, cylindrical lenses or mirrors, and/or prisms may be used to produce elliptical beam spots.

In the example implementations described herein, input beam shaping optics 210 and output beam shaping optics 230 shape all beams of light launched to and/or from the input ports and/or output ports. However, in some implementations, separate beam shaping optics may be provided for each port (e.g., integrated with the optical fiber/waveguides).

As shown in FIGS. 2A-2C, input beam shaping optics 210 and output beam shaping optics 230 may each include a cylindrical lens optically disposed between two spherical lenses. Here, a cylindrical axis of the cylindrical lens in input beam shaping optics 210 is oriented in the first direction (e.g., the direction parallel to the x-axis), while a cylindrical axis of the cylindrical lens in output beam shaping optics 230 is oriented in the second direction (e.g., the direction parallel to the y-axis) that is perpendicular to the first direction. As shown in FIG. 2A, elements of input beam shaping optics 210 and elements of output beam shaping optics 230 may be oriented such that a major axis of an elliptical beam spot on beam splitter 215 and a major axis of an elliptical beam spot on deflector array 220 are perpendicular. A major axis of a beam spot is the axis in which the beam spot has its longest length.

In some implementations, a ratio of a length of a pair of axes (e.g., an axis parallel to the y-direction and an axis parallel to the x-direction) of the elliptical beam may be referred to as an ellipticity ratio (e.g., A:1 or 1:A, as labeled in FIG. 2A). In some implementations, the value of A may be as high as a number of ports of MCS 200. For example, A may be as high as N (e.g., such that the ellipticity ratio is N:1 on a beam splitter 215 side of ATO element 225, and 1:N on the deflector array 220 side of ATO element 225), where N is the number of output ports of output port array 235). As a particular example, the ellipticity ratio of the elliptical beam may, on the beam splitter 215 side of ATO element 225, be 64:1, 32:1, 16:1, 8:1, or 4:1 for output port arrays 235 with 64 ports, 32 ports, 16 ports, 8 ports, or 4 ports, respectively. Similarly, the ellipticity ratio of the elliptical beam may, on the deflector array 220 side of ATO element 225, be 1:64, 1:32, 1:16, 1:8, or 1:4 for output port arrays 235 with 64 ports, 32 ports, 16 ports, 8 ports, or 4 ports, respectively. In practice, the value of A may be less than N, for example, the value of A may be 4 (e.g., such that the ellipticity ratios are 4:1 on the beam splitter 215 side and 1:4 on the deflector array 220 side) when output port array 235 includes 16 ports. As described above, an ellipticity ratio is a ratio of length in two selected axes. In FIG. 2A, The ellipticity ratio of the beams are identified as the ratio of length in the y-axis to length in the x-axis.

Beam splitter 215 includes an element for splitting an elliptical beam (e.g., each of the M elliptical beams produced by input beam shaping optics 210) into N portions, and sending the N portions of each of the M elliptical beams to ATO element 225. Beam splitter 215 splits the elliptical beam independent of wavelength and, thus, splits the elliptical beam such that each of the N portions includes some of each wavelength channel included in the elliptical beam. In some implementations, beam splitter 215 may include a diffractive beam splitter. In some implementations, as shown in FIG. 2A, beam splitter 215 may include a bulk optical element that splits each of the M elliptical beams. Alternatively, beam splitter 215 may include M different optical elements, each arranged to split a particular elliptical beam of the M elliptical beams. In some implementations, a direction in which beam splitter 215 splits an elliptical beam (herein referred to as a splitting direction) is perpendicular to the direction in which the input ports of input port array 205 are arranged (i.e., perpendicular to the x-axis) and is parallel to an array direction of deflector array 220, as described below.

Deflector array 220 includes an array (e.g., a one-dimensional (1D) array or a two-dimensional (2D) array) of individually controllable beam-steering elements (herein referred to as deflectors). For example, deflector array 220 may include an array of N individually controllable deflectors, which are aligned in the second direction (e.g., parallel to the y-axis). The direction corresponding to the minor axis of the elliptical beams at deflector array 220 may be referred to as an array direction. The direction corresponding to the major axis of the elliptical beams at the deflector array 220 may be referred to as a tilting direction. These directions are illustrated in FIG. 2E. Deflector array 220 is oriented such that each of the N deflectors receives one of N portions of a beam of light that is split by beam splitter 215 (e.g., where each of the N portions is incident on a different deflector in deflector array 220). As shown, deflector array 220 is oriented such that each of the N deflectors may selectively deflect a portion of the beam of light to a different output port of output port array 235.

In some implementations, each deflector in deflector array 220 selectively deflects (about one direction) light incident thereon at a controllable angle. More specifically, each deflector of deflector array 220 selectively deflects light incident thereon in a switching direction. For deflector arrays 220 having deflectors that provide deflection in one dimension (i.e., 1D deflectors), the term "switching direction" refers to a direction that light is directed. For example, if a 1D deflector is configured to deflect light at an angle to a side of deflector array 220, as for example deflector array 220 in free-space MCS 200, the switching direction is a horizontal direction (e.g., the x-direction). Referring to FIGS. 2A-2C, an array direction of deflector array 220 (i.e., a direction in which deflectors are arranged) is parallel to the y-axis, while the switching direction for deflector array 220 is parallel to the x-axis (i.e., the switching direction is perpendicular to the array direction).

In one implementation, deflector array 220 includes an array of transmissive elements, such as an array of liquid crystal phase elements, one or more arrays of liquid crystal polarization controllers and one or more birefringent wedges, an array of tiltable prisms, or the like. For example, deflector array 220 may include a liquid crystal phase modulator array that provides selective beam steering via refractive index control. Here, input port array 205 and/or output port array 235 are optically coupled to one or more elements producing light having a predetermined polarization state.

In another implementation, deflector array 220 may include an array of reflective elements, such as a tilting mirror array, a reflective array of liquid crystal phase elements, or the like. In an implementation where deflector array 220 includes a tilting mirror array, tilting of each mirror may be achieved using an actuator (e.g., an electrostatic actuator, a piezoelectric actuator, an electromechanical actuator, an electromagnetic actuator, or the like). For example, deflector array 220 may include a micro-electromechanical system (MEMS) array of electrostatically controlled micro-mirrors (e.g., a MEMS array on a MEMS chip). When each deflector in deflector array 220 is a micro-mirror, the micro-mirrors within each array are tiltable about a common tilting axis that is perpendicular to the switching direction and parallel to the array direction. For example, with reference to FIG. 2A, in a case where deflector array 220 is a MEMS array, a tilting axis for deflectors of deflector array 220 is parallel to the y-axis, which is perpendicular to the switching direction (e.g., the x-direction) and parallel to the array direction (e.g., in the y-direction). In an implementation where deflector array 220 is a liquid crystal on silicon phase modulator array, light beams are steered by linearly tilting the incoming beam's phase front. In some implementations, deflector array 220 may include a two-dimensional (2D) array (e.g., when beam splitter 215 is designed to create a 2D spot pattern rather than a 1D spot pattern). In the case of a 2D array, the array direction may be the direction of the 2D array that has the largest number of deflectors.

ATO element 225 includes an element to direct light transmitted between beam splitter 215 and deflector array 220. More specifically, ATO element 225 transforms beam angles, produced by beam splitter 215 and transmitted toward ATO element 225, into beam offsets (i.e., relative to an optical axis of ATO element 225). ATO element 225 transforms each of the N portions from an ellipticity ratio of A:1 at beam splitter 215 to an ellipticity ratio of 1:A at deflector array 220. Since the minor axis of each portion has a larger divergence and since the angle-to-offset property of the ATO element 225 transforms that larger divergence angle into a larger beam size (major axis), both transformations may relate to the same function of the ATO element. In some implementations, ATO element 225 may be referred to as a "Fourier lens." In general, ATO element 225 is an element having optical power, such as a convex lens (e.g., a bi-convex lens, a plano-convex lens, a concave-convex (meniscus) lens, or the like), a gradient-index (GRIN) lens, a concave mirror, or the like. For example, in one implementation, ATO element 225 is a spherical or aspherical lens having a focal length f (e.g., as indicated in FIGS. 2B and 2C). In another implementation, ATO element 225 is formed from two or more lenses.

During operation, as shown in FIG. 2A, the nth input port of input port array 205 launches a beam of light toward input beam shaping optics 210. As shown, the input ports of input port array 205 may be aligned along a direction parallel to the x-axis. Beam shaping optics 210 causes the beam of light to produce an elliptical beam spot on beam splitter 215. Each elliptical beam spot for each input may strike the beam splitter aligned in the y-axis and offset in the x axis. As shown in FIG. 2A, beam shaping optics 210 may cause the major axis of an elliptical beam to be oriented in the y-direction and the minor axis of the elliptical beam to be oriented in the x-direction.

Beam splitter 215 then splits an elliptical beam into N portions, and sends the N portions to ATO element 225 (e.g., each at a different angle with respect to the optical axis). Here, beam splitter 215 may split the elliptical beam such that the N portions are aligned in the y-direction. ATO element 225 transforms the angle of each of the N portions into a beam offset in the y-direction (relative to the optical axis), transforms the ellipticity of each portion, and directs each of the N portions toward deflector array 220.

As described herein, and as shown in FIG. 2A, the elliptical beam incident on beam splitter 215 has an ellipticity ratio of A:1 (A in the y-axis, 1 in the x-axis) and the N portions leaving the beam splitter 215 at different angles have the same initial shape. Each of the N portions are transformed in shape (e.g. by ATO element 225) such that they have an ellipticity ratio of 1:A (1 in the y-axis, A in the x-axis). A length of a major axis of a given portion of the elliptical beam becomes a length of the minor axis of the portion of the elliptical beam incident on deflector array 220, and the length of the minor axis of the portion of the elliptical beam becomes the length of the major axis of the portion of the elliptical beam incident on deflector array 220 (i.e., the ellipticity ratio transforms from A:1 to 1:A). In other words, at deflector array 220, the major axis of the portion of the elliptical beam may be oriented in the x-direction and the minor axis of the elliptical beam to be oriented in the y-direction.

Each of N deflectors of deflector array 220 receives a different portion of the N portions. As shown, deflector array 220 may be arranged such that the array direction is oriented in the y-direction, and the switching direction is oriented in the x-direction. As further shown in FIG. 2A, each of the N deflectors may selectively deflect a portion of the elliptical beam, incident thereon, toward a corresponding output of output port array 235. For example, as shown, a first deflector and a third deflector may deflect the portions, incident thereon, toward a first output of output port array 235 and a third output of output port array 235, respectively. Conversely, a second deflector and a fourth deflector may deflect the portions, incident thereon, such that a second output of output port array 235 and a fourth output of output port array 235 do not receive portions of the input beam. In such a case, the second deflector and the fourth deflector may deflect a portion of a different input beam launched by a different input port (e.g., the m+1th input beam or the m-1th input beam). A portion from each of the different inputs 205 may be incident, at different angles, on a given deflector and controlling the deflector determines which portion incident on the deflector couples to the corresponding output port.

As further shown, after deflection by deflector array 220, output beam shaping optics 230 causes the portions of the elliptical beam to produce round beam spots on the first and third output ports of output port array 235, and the first and third output ports may output the received portions of the input beam.

As shown in FIGS. 2A-2C, ATO element 225 may be optically disposed between beam splitter 215 and deflector array 220, typically such that beam splitter 215 and deflector array 220 are disposed substantially at a focal plane of ATO element 225. Notably, ATO element 225 illustrated in FIGS. 2A-2C is shown as a lens for ease of illustration only. In implementations in which ATO element 225 is reflective, the optical paths illustrated in FIGS. 2A-2C are "folded" about a plane of ATO element 225. In an implementation where ATO element 225 is a lens, beam splitter 215 and deflector array 220 are disposed on opposite sides of ATO element 225, substantially at opposing focal planes. In implementations where ATO element 225 is reflective, beam splitter 215 and deflector array 220 are disposed on a same side of ATO element 225, substantially at the same focal plane.

With reference to FIG. 2A, and as described above, beams of light incident on beam splitter 215 and portions incident on deflector array 220 have an elliptical cross-section. A beam of light with an elliptical cross-section is herein referred to as an elliptical beam. Here, a length of the major axis of an elliptical beam incident on beam splitter 215 becomes a length of the minor axis of the portion of the elliptical beam incident on deflector array 220, and the length of the minor axis of the elliptical beam on beam splitter 215 becomes the length of the major axis of the portion of the elliptical beam incident on deflector array 220. In other words, as shown in FIG. 2A, the major axis of the portion of the elliptical beam, before passing through ATO element 225, is parallel to the y-axis, whereas the major axis of the portion of the elliptical beam, after passing through ATO element 225, is parallel to the x-axis. The elliptical beams at the beam splitter 215 and the portions at the deflector array 220 may be of approximately the same size when the focal length f of the ATO element 225 is approximately equal to the square root of a quantity equal to a Rayleigh range of a major axis of the elliptical beam times a Rayleigh range of a minor axis of the elliptical beam. However, it is not necessary for the sizes of the elliptical beams to be the same at the beam splitter 215 and the deflector array 220 to be the same; since beam splitter 215 and deflector array 220 have different construction, different operating principles, and different costs per unit area, it may be desirable to make the beams incident on one element larger than on the other element so long as the ellipticity ratio is maintained.

With reference to FIGS. 2B and 2C, the operation of free-space MCS 200 is described in further detail. As shown in FIG. 2B, a beam of light is launched into the optical switch core at the nth input port in input port array 205. In general, the beam of light will be a substantially collimated beam of light (e.g., collimated via a micro-lens from a micro-lens array (not shown)). The beam of light passes through the input beam shaping optics 210, which transform the beam of light so that the beam of light has an elliptical cross-section (e.g., with an ellipticity ratio of 32:1, 16:1, 8:1, 4:1, or the like). The elliptical beam then propagates to beam splitter 215, where the elliptical beam is incident thereon with an elliptical beam spot having a major axis parallel to a splitting direction of beam splitter 215 (e.g., elongated in the vertical direction with respect to FIG. 2C, such that the major axis is parallel to the y-axis).

As shown in FIG. 2C, beam splitter 215 splits the elliptical beam into N portions (each with a same elliptical cross-section) and angularly disperses the N portions of the elliptical beam to ATO element 225. As further shown, ATO element 225 directs each of the N portions of the elliptical beam towards a different deflector of the N deflectors in deflector array 220. As shown, beam splitter 215 angularly disperses the N portions of the elliptical beam at different angles in the splitting direction that is parallel to the y-axis. As a result, the N portions of the elliptical beam are incident on ATO element 225 at different angles relative to an optical axis of the ATO element 225. ATO element 225 transforms these angles to offsets (e.g., shown as vertical offsets in FIG. 2C) relative to the optical axis of the ATO element 225. More specifically, the N portions of the elliptical beam are directed to each of the N deflectors of deflector array 220 and are transformed in shape so each of the N portions has an elliptical ratio of 1:A (1 in the y-axis, A in the x-axis).

As further shown in FIG. 2C, each of the N portions of the elliptical beam is incident on a different deflector in deflector array 220 with an elliptical beam spot having a major axis parallel to the switching direction of deflector array 220 (e.g., elongated in the horizontal direction such that the major axis is parallel to the x-axis). In this way, each of the N portions of a particular elliptical beam may be incident on a different deflector of deflector array 220. Portions of other elliptical beams, launched in the switch core by other input ports of input port array 205, may be incident upon each of the deflectors of deflector array 220, at different angles, in a similar manner, an example of which is described below with regard to FIG. 2D. Put another way, a quantity of up to M portions, corresponding to M elliptical beams (e.g., each being launched by a respective input port of input port array 205) may be incident on a single deflector of deflector array 220.

A given deflector of deflector array 220 selectively deflects a portion of an elliptical beam, incident thereon, to an output port optically coupled to the deflector. For example, as described above, a quantity of M portions of M elliptical beams may be incident on a particular deflector of deflector array 220. Here, the deflector may deflect a particular portion of the M portions (e.g., a portion corresponding to a beam launched by a particular input port) at an angle toward the output port, while deflecting other portions (e.g., portions corresponding to beams launched by other input ports) at angles away from the output port (e.g., such that a single portion, of the M portions, is directed toward the output port).

In some implementations, a first subset of portions of a particular beam may be directed to a first subset of the output ports, while a second subset of the portions of the particular beam may directed away from a second subset of the output ports. In this way, portions of the particular beam may be multicast to a subset of the output ports.

As further shown, the portions of the elliptical beams are directed to output beam shaping optics 230, which transform the portions of the elliptical beams to have circular cross-sections (e.g., before being focused on the output ports). In general, an angle provided by the deflector of deflector array 220 is selected to either prevent a given portion from reaching the output port or to optimize optical coupling with the output port. However, in some implementations, the angle for coupling with the output port may be selected to provide a predetermined amount of attenuation.

Figure 2D:
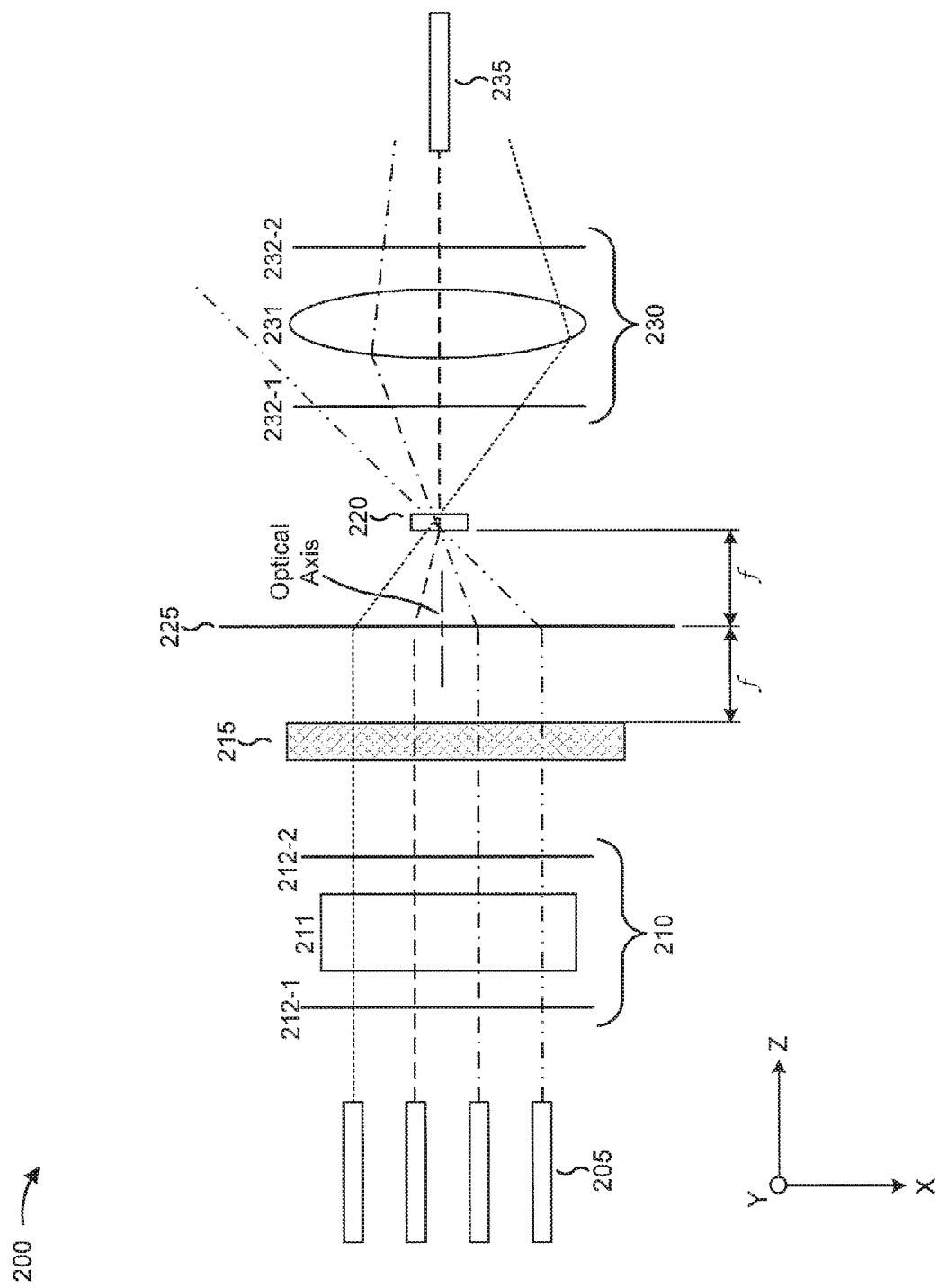
Figure 2E:
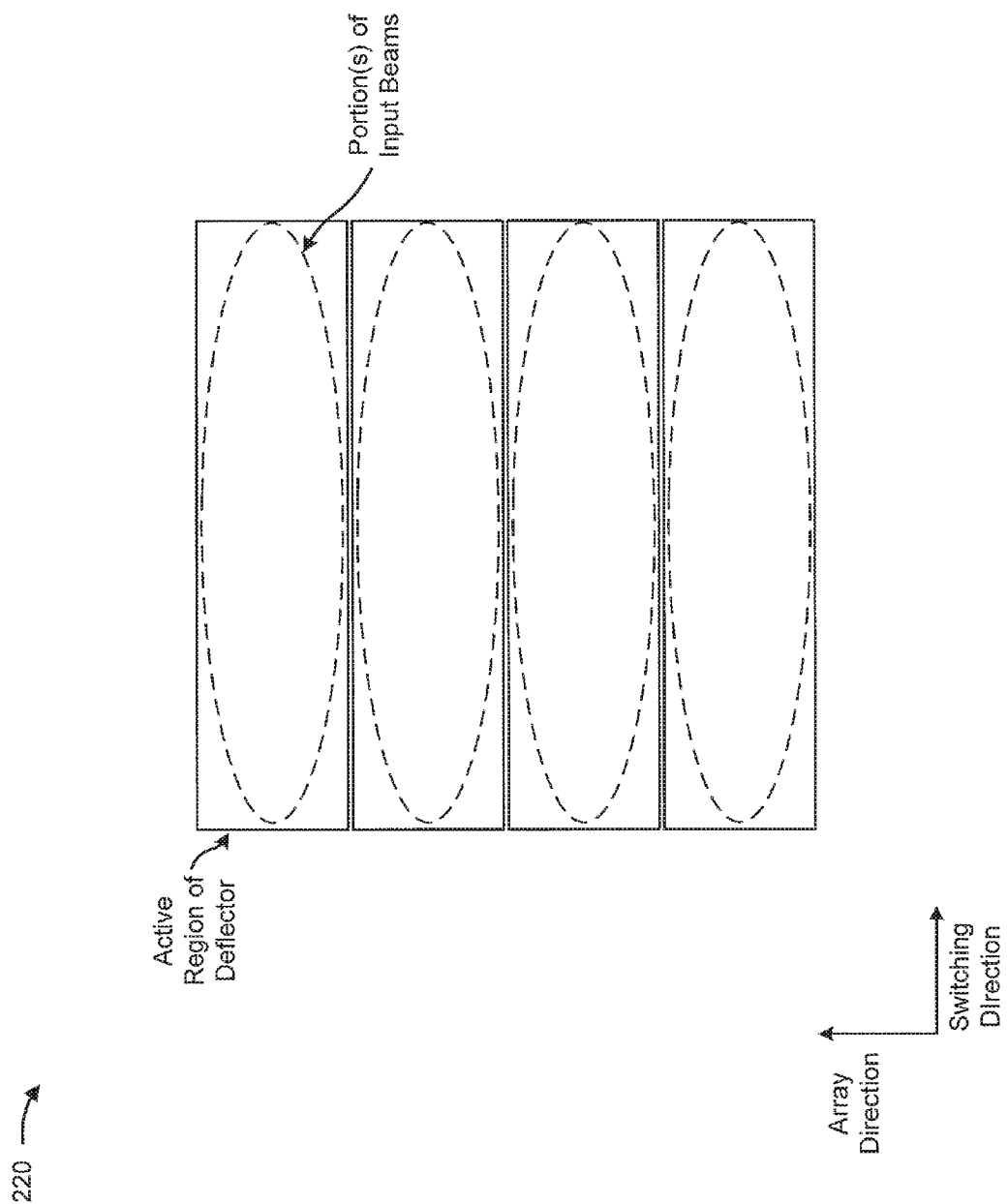

An example operation showing deflection of M portions of M input beams by a particular deflector of deflector array 220 is shown in FIG. 2D. As shown in FIG. 2D, M portions of M elliptical beams may be incident on a given deflector (e.g., in a same active region) of deflector array 220 at different angles. Similarly, M portions of the M elliptical beams may be incident on each other deflector of deflector array 220 (not shown). Here, the particular deflector may be controlled (e.g. tilt) such that each portion, of the M portions, is deflected at a different angle, where one of the M portions (e.g., the larger dashed line) is coupled to an output port corresponding to the particular deflector. As shown, the other portions may be deflected (e.g., in the x-direction) away from the output port such that the other portions are not incident on or coupled to the output port.

In some implementations, as illustrated in FIGS. 2A-2D, beam splitter 215 and deflector array 220 having substantially perpendicular splitting and switching directions, where beam splitter 215 and deflector array 220 are optically disposed on either side of ATO element 225, means that only a single row of deflectors is needed in deflector array 220 (i.e., only a 1D array is needed), and that each deflector needs to provide deflection in a single direction (i.e., 1D deflectors). For example, if deflector array 220 includes MEMS mirrors, then each MEMS mirror needs to tilt about a single axis (i.e., a 1D MEMS mirror). Accordingly, deflector array 220 may be relatively simple and/or may be manufactured at a lower cost (e.g., as compared to a 2D array with 2D MEMS mirrors). For example, if deflector array 220 is a MEMS micro-mirror array, then each deflector will only require two drive electrodes (i.e., a 1D MEMS mirror rather than four drive electrodes required for a 2D MEMS mirror), thus reducing the cost of drive electronics. Additionally, manufacture of 1D MEMS mirrors may be easier and/or less costly than manufacture of 2D MEMS mirrors. Furthermore, when deflector array 220 has only a single row of deflectors, the input fiber array and/or the output fiber array may be 1D fiber arrays, which may be simpler and/or less costly to manufacture than a 2D fiber array. However, in some implementations, a 2D beam splitter 215 and a 2D deflector array 220 may be used (e.g., when beam splitter 215 has a high diffraction efficiency and better uniformity among the diffracted spots when creating a 2D spot pattern, as compared to a 1D spot pattern, that outweighs a cost and/or complexity of using 2D MEMS mirrors and 2D fiber array).

Furthermore, providing input beam shaping optics 210 and output beam shaping optics 230 that provide an elliptical beam spot on deflector array 220, where the beam spots are elongated in the switching direction, means that individual deflectors in deflector array 220 can be smaller in area (e.g., since the beam size is reduced in the array direction). This may act to further reduce cost and/or increase manufacturability when deflector array 220 is a MEMS mirror since, for example, a cost of MEMS devices is roughly proportional to a surface area of the MEMS mirror.

In some implementations, dimensions of each micro-mirror of the MEMS mirror, in both the array direction and the switching direction, may substantially match dimensions of the elliptical beam incident thereon. For example, each micro-mirror of the MEMS mirror may have a size in the switching direction that is approximately equal to three times the $1/e^2$ intensity radius of a major axis of the beam (e.g., between 2.4 and 5.0 times the $1/e^2$ intensity radius in the major axes), and may have a size in the array direction that is approximately equal to three times the $1/e^2$ intensity radius of a minor axis of the beam (e.g., between 2.4 and 4.0 times the $1/e^2$ intensity radius in the minor axes). Here, since the minor axis of the elliptical beam is reduced in the array direction (e.g., as compared to a round beam) the size of the micro-mirror to be reduced in the array direction (e.g., since the micro-mirror may be sized based on the dimensions of the minor and major beam axes, as described above). Thus, an overall size of the micro-mirror may be reduced (e.g., as compared to a micro-mirror sized to receive a round beam). It follows that a reduction in size of each micro-mirror in the array direction allows for the overall size of the MEMS mirror array (and the overall size of MCS 200) to be significantly reduced in the array direction (e.g., when M≥16 or N≥16).

FIG. 2E is a diagram of an example illustrating a manner in which dimensions of each deflector of deflector array 220 (e.g., each micro-mirror of a MEMS mirror array) may substantially match dimensions of the elliptical beams incident thereon. As shown in FIG. 2E, each deflector may have an active region to receive (e.g., in the same active region) a portion from each of M input beams. As shown, a size of an active region of a given deflector (e.g., four deflectors are shown in FIG. 2E) may substantially match a size of an incident portion of an elliptical beam in both the array direction and the switching direction. Here, the size reduction achievable in the array direction (due to the use of elliptical beams) may allow for a reduction in height and/or area of the deflector, deflector array 220, the switch core of MCS 200, and/or MCS 200 itself. As noted above, FIG. 2E is provided merely as an example, and other implementations are possible.

Additionally, the use of elliptical beams reduces the overall switch size of free-space MCS 200. For example, assume that the switch core of free-space MCS 200 shown in FIGS. 2A-2D uses input beams and output beams of round and of equal beam size (e.g., radius $\omega_0$). In this case, a focal length f of ATO element 225 can be equal to the Rayleigh range $z_r$ of the input and beams and the output beams, and may be calculated as follows:

$$f = z_r = \pi \omega_0^2 / \lambda$$

where λ is a center wavelength of the input beams and the output beams. However, if a radius of the input beam is not equal to a radius of the output beam, then the focal length $f$ of ATO element 225 may be calculated as follows:

$$f=\pi(\omega_{01})(\omega_{01})/\lambda.$$

Therefore, by reducing $\omega_{02}$, the focal length $f$ of ATO element 225 is reduced and the overall switch size is reduced. Note that in both the x-direction and the y-direction, this relationship exists, since in one case $\omega_{01}$ is the radius of the input beam and $\omega_{02}$ is the radius of the output beam, and in the other case $\omega_{01}$ is the radius of the output beam and $\omega_{02}$ is the radius the input beam.

However, the radius of the beam in the switching direction of deflector array 220 should be a certain minimum size in order to obtain a sufficiently small divergence angle of the beam and thus enable switching to the desired number of output ports, where the divergence angle $\theta$ of the beam is related to the beam size (i.e., radius) by the following formula:

$$\theta=\lambda/(\pi\omega_0).$$

As an illustrative example, if $\theta_{lens}$ is a divergence angle that would allow the beam to be fully captured by ATO element 225, then the beam size must be greater than $\omega_{min}=\lambda/\pi\theta_{lens}$. In order to enable switching to 30 ports, the beam divergence should therefore be less than $\theta_{lens}/30$ and thus the beam size must be greater than $30\times\omega_{min}$.

However, in the non-switching direction (i.e., in the array direction), there is no such restriction, except that the beam divergence should fall within the aperture of ATO element 225. For example, the beam size may be reduced as low as $\omega_{min}$. Accordingly, since the beam width in the array direction can be greatly reduced, the overall beam spot size at the output ports may be reduced and, as a result, the required focal length $f$ may be reduced. Reducing the required focal length reduces the overall size of the switch core. Notably, when deflector array 220 is a MEMS micro-mirror arrays, a lens aperture does not typically limit the design of a free-space MCS. Rather, other factors, such as a maximum beam steering angle achievable by the MEMS micro-mirrors typically limit the free-space MCS design. Regardless, providing beam shaping optics that cause beam spots to be reduced in the array direction allow for a more compact free-space MCS.

The number and arrangement of elements shown in FIGS. 2A-2D are provided as examples. In practice, the switch core of free-space MCS 200 may include additional elements, fewer elements, different elements, differently formed elements, differently designed elements, or differently arranged elements than those shown in FIGS. 2A-2D. Additionally, or alternatively, a set of elements (e.g., one or more elements) of the switch core of free-space MCS 200 may perform one or more functions described as being performed by another set of elements of the switch core of free-space MCS 200.

For example, while the optical layout of FIGS. 2A-2D is illustrated in an unfolded configuration for clarity, in some embodiments, the optical layout will provide a folded configuration.

Implementations described herein provide a free-space MCS that uses elliptical beams in order to reduce a size of a switch core of the free-space MCS and/or an overall size of the free-space MCS. For example, in some implementations, deflectors of a deflector array may be comparable in area to an area of an elliptical beam incident thereon, thereby allowing for a smaller deflector array design (e.g., as compared to a MCS that uses round beams). As another example, in some implementations, an ATO element may have a reduced focal length due to the use of elliptical beams, thereby reducing overall size of the free-space MCS (e.g., as compared to a MCS that uses round beams). In some implementations, the elliptical beams have an ellipticity ratio that is different than the 1:1 ellipticity ratio of round beams. For example, the elliptical beams may have an ellipticity ratio that corresponds to a number of ports of the free-space MCS (e.g., 32, 16, 8, 4, or the like).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A free-space multicast switch (MCS), comprising:
an input port array including an input port to launch a beam of light;
an output port array including N (N>1) output ports;
a beam splitter optically disposed between the input port array and the output port array, the beam splitter to split the beam of light into at least N portions in a splitting direction;
a deflector array optically disposed between the beam splitter and the output port array,
the deflector array including N deflectors aligned in an array direction,
each deflector, of the N deflectors, having a switching direction that is substantially perpendicular to the splitting direction, and
each of the N deflectors having an active region with a size in the array direction that matches a size in the array direction of a portion, of the N portions, incident thereon;
first beam shaping optics optically disposed between the input port array and the beam splitter and second beam shaping optics optically disposed between the output port array and the deflector array,
the first beam shaping optics to shape the beam of light and form a first elliptical beam spot at the beam splitter, a major axis of the first elliptical beam spot being substantially perpendicular to the switching direction; and an angle-to-offset (ATO) element optically disposed between the beam splitter and the deflector array, wherein the beam splitter and the deflector array are each disposed such that the ATO element is to direct each of the at least N portions of the beam of light from the beam splitter to a different deflector of the N deflectors, each of the at least N portions having, at the deflector, a second elliptical beam spot with a major axis substantially parallel to the switching direction.

2. The free-space MCS of claim 1, wherein a length of a major axis of the first elliptical beam spot is at least four times larger than a length of a minor axis of the first elliptical beam spot, and a length of a major axis of the second elliptical beam spot is at least four times larger than a length of a minor axis of the second elliptical beam spot.

3. The free-space MCS of claim 1, wherein the beam splitter is a diffractive beam splitter.

4. The free-space MCS of claim 1, wherein N is greater than or equal to sixteen.

5. The free-space MCS of claim 1, wherein the free-space MCS includes at least 16 input ports or at least 16 output ports.

6. The free-space MCS of claim 1, wherein the ATO element comprises one of a convex lens, a gradient index lens, or a concave mirror.

7. The free-space MCS of claim 1, wherein the ATO element comprises at least one spherical lens or aspherical lens.

8. The free-space MCS of claim 1, wherein the ATO element has a focal length substantially equal to a square root of a Rayleigh range of the major axis of the first elliptical beam spot multiplied by a Rayleigh range of a minor axis of the first elliptical beam spot.

9. The free-space MCS of claim 1, wherein each of the first beam shaping optics and the second beam shaping optics comprises:
a cylindrical lens;
a cylindrical mirror; or first and second anamorphic prisms.

10. The free-space MCS of claim 1, wherein the deflector array comprises one of a one-dimensional (1D) array of 1D tilting micro-electromechanical system (MEMS) micro-mirrors, a 1D array of 1D switching liquid crystal phased elements, or a 1D array of liquid crystal polarization rotating elements and a polarization splitting element.

11. The free-space MCS of claim 1, wherein each deflector of the N deflectors is a one-dimensional tilting micro-electromechanical system (MEMS) micro-mirror having a size in the switching direction that is greater than a size in the array direction.

12. The free-space MCS of claim 11, wherein each MEMS micro-mirror has a size in the array direction between 2.4 and 4.0 times a $1/e^2$ intensity radius of a minor axis of the second elliptical beam spot.

13. The free-space MCS of claim 12, wherein each MEMS micro-mirror has a size in the switching direction between 2.4 and 5.0 times a $1/e^2$ intensity radius in of a major axis of the second elliptical beam spot.

14. The free-space MCS of claim 1, wherein an orientation of the input port array is perpendicular to an orientation of the deflector array and the output port array.

15. The free-space MCS of claim 1, wherein the input port array is optically coupled to an input fiber array, and the output port array is optically coupled to an output fiber array.

16. A free-space multicast switch (MCS), comprising:
an input port array, each input port of the input port array to launch a beam of light;
an output port array including N (N>1) output ports;
a beam splitter optically disposed between the input port array and the output port array to split each of the beams of light into at least N portions in a splitting direction;
a deflector array optically disposed between the beam splitter and the output port array,
the deflector array including N deflectors,
each of the N deflectors to deflect light in a switching direction perpendicular to the splitting direction,
each of the N deflectors to receive one of the N portions from each beam of light, and to couple a selected portion to an output port of the output port array, and
each of the N deflectors having an active region with dimensions matching dimensions of the N portions incident thereon;
first beam shaping optics optically disposed between the input port array and the beam splitter to transform a shape of the beams of light to be elliptical in the splitting direction at the beam splitter;
angle-to-offset optics optically disposed between the beam splitter and the deflector array to transform a shape of the N portions to be elliptical in the switching direction at the deflector array; and
second beam shaping optics optically disposed between the deflector array and the output port array to transform a shape of the selected portions to be circular at the output port array.

17. The free-space MCS of claim 16, wherein a length of a major axis of the shape of the beam at the beam splitter is at least four times larger than a length of a minor axis of the beam at the beam splitter.

18. The free-space MCS of claim 16, wherein a length of a major axis of the shape of each of the N portions at the deflector array is at least four times larger than a length of a minor axis of each of the N portions at the deflector array.

19. A free-space multicast switch (MCS), comprising:
an input port array including an input port to launch a beam of light;
first beam shaping optics to shape the beam of light and form a first elliptical beam spot at a beam splitter,
the first elliptical beam spot having a first ellipticity ratio that is a ratio of a length of a first axis of the first elliptical beam spot to a length of a second axis of the first elliptical beam spot,
the first axis of the first elliptical beam spot being substantially parallel to a splitting direction of the beam splitter,
the second axis of the first elliptical beam spot being substantially perpendicular to the splitting direction of the beam splitter, and
the length of the first axis of the first elliptical beam spot being at least four times larger than the length of the second axis of the first elliptical beam spot;
the beam splitter to split the beam of light into N (N>1) portions in the splitting direction;
an angle-to-offset (ATO) element to form N second elliptical beam spots, corresponding to each of the N portions, at N different deflectors of a deflector array, each of the N second elliptical beam spots having a second ellipticity ratio that is a ratio of a length of a first axis of the second elliptical beam spot to a length of a second axis of the second elliptical beam spot,
- the first axis of the second elliptical beam spot being substantially perpendicular to a switching direction of the deflector array,
  - the switching direction being substantially perpendicular to the splitting direction,
- the second axis of the second elliptical beam spot being substantially parallel to the splitting direction of the beam splitter, and
- the length of the first axis of the second elliptical beam spot being at least four times smaller than the length of the second axis of the second elliptical beam spot;

the deflector array, including the N deflectors, to deflect each of the N portions in the switching direction; and an output port array including N output ports, each output port corresponding to a different deflector of the N deflectors.

20. The free-space MCS of claim 19, wherein each of the N deflectors has an active region with dimensions that match dimensions of the N portions incident thereon.

* * * * *